(12) United States Patent
Hiraiwa

(10) Patent No.: US 6,827,991 B2
(45) Date of Patent: Dec. 7, 2004

(54) TRANSPARENT MOLDED PLASTIC ARTICLE HAVING A SURFACTANT LAYER

(75) Inventor: Takashi Hiraiwa, Anjo (JP)

(73) Assignee: Denso Corporation, Kariya (JP)

( * ) Notice: Subject to any disclaimer, the term of this patent is extended or adjusted under 35 U.S.C. 154(b) by 36 days.

(21) Appl. No.: 10/270,654

(22) Filed: Oct. 16, 2002

(65) Prior Publication Data
US 2003/0072944 A1 Apr. 17, 2003

(30) Foreign Application Priority Data
Oct. 17, 2001 (JP) ........................................ 2001-319747

(51) Int. Cl.[7] .......................... B32B 27/06; B60R 27/00
(52) U.S. Cl. ...................... 428/31; 428/411.1; 428/922; 428/924
(58) Field of Search ................................ 428/31, 411.1, 428/922, 924

(56) References Cited

U.S. PATENT DOCUMENTS 3,980,041 A * 9/1976 Evans ........................ 116/62.3
4,642,263 A * 2/1987 Culbertson .................. 428/336
4,805,924 A * 2/1989 Birchfield et al. .......... 280/752

FOREIGN PATENT DOCUMENTS

GB 1558064 * 12/1977

* cited by examiner

Primary Examiner—Ramsey Zacharia
(74) Attorney, Agent, or Firm—Posz & Bethards, PLC

(57) ABSTRACT

A transparent molded plastic article, which is used for, for example, a component of an auto instrument, includes a transparent molded plastic body and a surfactant layer, which is located on a surface of the plastic body. The surfactant layer contains a quaternary ammonium salt having a mean molecular weight of 260 to 385 to eliminate static electricity of the plastic body. Therefore, the transparent molded plastic article is substantially static-electricity-free while the deterioration in transparency of the surfactant is prevented.

13 Claims, 4 Drawing Sheets

FIG. 2

| | | | MEAN MOLECULAR WEIGHT | | | |
|---|---|---|---|---|---|---|
| | | | 264 | 292 | 320 | 362 |
| SAMPLE | CONTENT (WEIGHT %) | | 0.68 | — | 0.78 | 0.28 |
| | CATEGORY | | MONOALKYLTRI-METHYL-AMMONIUM SALT | MONOALKYLTRI-METHYL-AMMONIUM SALT | MONOALKYLTRI-METHYL-AMMONIUM SALT | DIALKYLDI-METHYL-AMMONIUM SALT |
| | PRODUCT NAME | | ARQUAD 12-33W | — | ARQUAD 16-29 | ARQUAD 210-80E |
| STUDY RESULTS | STATIC POTENTIAL (V) | RIGHT AFTER COATING | 550 | 450 | 200 | 200 |
| | | 5 MIN AFTER COATING | 400 | 300 | 50 | 50 |
| | | 10 MIN AFTER COATING | 200 | 150 | 0 | 0 |
| | | AFTER RUBBING | 200 | 100 | 50 | 50 |
| | APPEARANCE | FIRST ACCELERATION TEST | TRANSPARENT | TRANSPARENT | TRANSPARENT | TRANSPARENT |
| | | SECOND ACCELERATION TEST | TRANSPARENT | TRANSPARENT | TRANSPARENT | TRANSPARENT |
| | | NORMAL CONDITION TEST | TRANSPARENT | TRANSPARENT | TRANSPARENT | TRANSPARENT |
| | | CHEMICAL REACTIVITY | TRANSPARENT | TRANSPARENT | TRANSPARENT | TRANSPARENT |
| JUDGMENT | | | GOOD | GOOD | BETTER | BETTER |

FIG. 3

| SAMPLE | | | MEAN MOLECULAR WEIGHT | | |
|---|---|---|---|---|---|
| | | | 370 | 405 | 448 |
| | CONTENT (WEIGHT %) | | 0.33 | — | 0.30 |
| | CATEGORY | | N-ALKYLDIMETHYLBENZYL-AMMONIUM SALT AND N-ALKYLDIMETHYL-AMMONIUM SALT | DIALKYLDI-METHYL-AMMONIUM SALT | DIALKYLDI-METHYL-AMMONIUM SALT |
| | PRODUCT NAME | | STATICIDE GP | — | ARQUAD 2C-75 |
| STUDY RESULTS | STATIC POTENTIAL (V) | RIGHT AFTER COATING | 150 | 100 | 0 |
| | | 5 MIN AFTER COATING | 0 | 0 | 0 |
| | | 10 MIN AFTER COATING | 0 | 0 | 0 |
| | | AFTER RUBBING | | | |
| | APPEARANCE | FIRST ACCELERATION TEST | TRANSPARENT | CLOUDY | CLOUDY |
| | | SECOND ACCELERATION TEST | TRANSPARENT | CLOUDY | CLOUDY |
| | | NORMAL CONDITION TEST | TRANSPARENT | CLOUDY | CLOUDY |
| | | CHEMICAL REACTIVITY | TRANSPARENT | WHITE PRECIPITATION | WHITE PRECIPITATION |
| JUDGMENT | | | BEST | UNACCEPTABLE | UNACCEPTABLE |

TRANSPARENT MOLDED PLASTIC ARTICLE HAVING A SURFACTANT LAYER

CROSS REFERENCE TO RELATED APPLICATION

This application is based on and incorporates herein by reference Japanese Patent Application No. 2001-319747 filed on Oct. 17, 2001.

BACKGROUND OF THE INVENTION

The present invention relates to a transparent molded plastic article that has a surfactant layer on a surface of it in order to eliminate static electricity.

Conventionally, a surfactant is coated as an anti-static agent on the surface of, for example, the glasses used in auto instruments to prevent foreign objects from sticking to the surface. In the latest instruments, plastic is commonly used for components such as a meter dial, a meter display pane, and a meter display-panel cover of an auto instrument because plastic is relatively light and affordable. In addition, plastic components are usually made by printing or painting transparent molded plastic bodies, so the instruments are more harmfully influenced by static electricity. Moreover, the instruments are usually assembled by press-fitting, screwing, and so on, so foreign objects such as a shaved flake and a fragment during the assembly stick to the surfaces of the plastic components due to static electricity. Thus, it is inevitable to coat a surfactant as an anti-static agent on the surfaces of the plastic bodies to eliminate static electricity. However, surfactant layers on the plastic components tend to lose transparency due to the time-dependent deterioration of the surfactant, so the plastic components with a surfactant layer tend to be disfigured as time goes by.

SUMMARY OF THE INVENTION

The present invention has been made in view of the above aspect with an object to provide a transparent molded plastic article that includes a surfactant layer and is substantially static-electricity-free and disfigurement-free.

In the present invention, a transparent molded plastic article includes a transparent molded plastic body and a surfactant layer, which is located on a surface of the plastic body. The surfactant layer contains a quaternary ammonium salt having a mean molecular weight of 260 to 385 to eliminate static electricity of the plastic body.

BRIEF DESCRIPTION OF THE DRAWINGS

The above and other objects, features and advantages of the present invention will become more apparent from the following detailed description made with reference to the accompanying drawings. In the drawings:

FIG. 2 is a figure showing part of the results in the study on surfactants that are different in mean molecular weight from each other;

FIG. 3 is a figure showing the rest of the results;

DETAILED DESCRIPTION OF THE PREFERRED EMBODIMENT

The present invention will be described in detail with reference to an embodiment.

Figure 1:
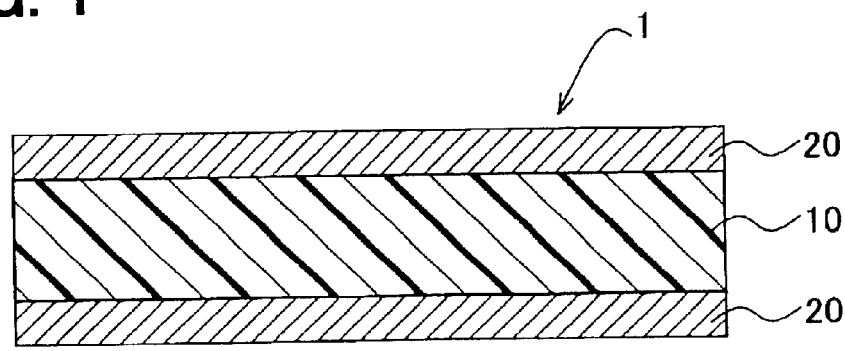
FIG. 1 is a schematic cross-sectional view of a transparent molded plastic article according to an embodiment of the present invention.

As shown in FIG. 1, a transparent molded plastic article 1 includes a transparent molded plastic body 10, which is in a plate shape, and a pair of surfactant layers 20. The article 1 can be applied to, for example, plastic components such as a meter display-panel cover and a meter dial of an auto instrument. The material of the plastic body 10 may be made of a resin such as acryl resin such as polymethylmethacrylate (MMA), which is usually used for the meter display-panel cover, polycarbonate (PC), which is usually used for the meter dial, and polyethylenetelephthalate (PET). Each surfactant layer 20 includes a surfactant as an anti-static agent and is located on each of two surfaces of the plastic body 10 to eliminate static electricity, as shown in FIG. 1. However, only one surfactant layer 20 may be formed on one surface. Each surfactant layer 20 contains a quaternary ammonium salt having a mean molecular weight of 260 to 385.

Figure 7:
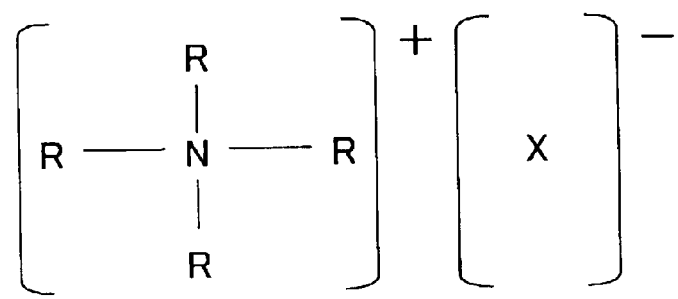
FIG. 7 is the generic structural formula of quaternary ammonium salts.
Figure 8:
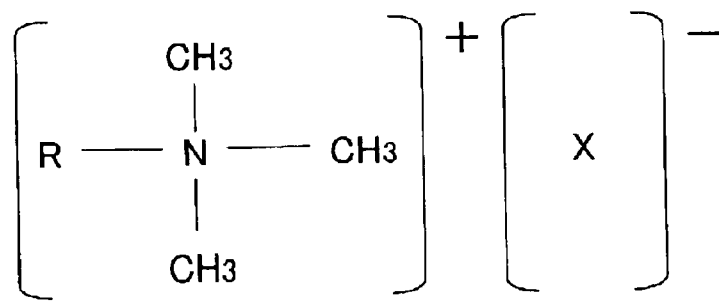
FIG. 8 is the generic structural formula of monoalkyltrimethylammonium salts.

As the quaternary ammonium salt, for example, dialkyldimethylammonium salt, monoalkyltrimethylammonium salt, a mixture of n-alkyldimethylbenzylammonium salt and n-alkyldimethylammonium salt, and a combination of the above salts may be used. The generic structural formulas of quaternary ammonium salts and monoalkyltrimethylammonium salts are shown in FIGS. 7 and 8, respectively. In FIGS. 7 and 8, the symbols R and X mean alkyl group and halogen such as chlorine, respectively. With the surfactant layers 20 including the quaternary ammonium salt, the transparent molded plastic article 1 is substantially static-electricity-free and disfigurement-free even if the article 1 is applied to the plastic components of an auto instrument, which are used under a relatively harsh condition.

In FIG. 1, each surfactant layer 20 contains a quaternary ammonium salt having a mean molecular weight of 260 to 385 as a surfactant. The mean molecular weight range was determined on the basis of the following study. As shown in FIGS. 2 and 3, seven surfactants, which are different in mean molecular weight from each other, were used for the study. The seven surfactants are; a monoalkyltrimethylammonium salt (I) having a mean molecular weight of 264, which is Arquad 12–33W of LION AKZO Co., LTD., a monoalkyltrimethylammonium salt (II) having a mean molecular weight of 292, a monoalkyltrimethylammonium salt (III) having a mean molecular weight of 320, which is Arquad 16–29 of LION AKZO Co., LTD., a dialkyldimethylammonium salt (IV) having a mean molecular weight of 362, which is Arquad 210-80E of LION AKZO Co., LTD., a mixture (V) of n-alkyldimethylbenzylammonium salt and n-alkyldimethylammonium salt having a mean molecular weight of 370, which is Staticide GP of ACL Staticide, Inc., a dialkyldimethylammonium salt (VI) having a mean molecular weight of 405, a dialkyldimethylammonium salt (VII) having a mean molecular weight of 448, which is Arquad 2C–75 of LION AKZO Co., LTD.

In the above surfactants, the monoalkyltrimethylammonium salt (II) having a mean molecular weight of 292 was prepared by blending the same type of salt (I) having a mean molecular weight of 264 and the same type of salt (III)

having a mean molecular weight of 320 in the ratio of one to one. The dialkyldimethylammonium salt (VI) having a mean molecular weight of 405 was prepared by blending the same type of salt (IV) having a mean molecular weight of 362 and the same type of salt (VII) having a mean molecular weight of 448 in the ratio of one to one.

The surfactants were respectively diluted by deionized water, and each diluted surfactant solution was separately sprayed with a spray gun on a surface of a transparent molded plastic plate 100, which was made of transparent MMA resin. Too high content of the surfactants disfigures the appearance of a transparent molded plastic article 2, which includes the transparent molded plastic body 100 and a surfactant layer 200, after coating, so the contents of the above surfactants (I) to (VII) were determined in consideration of the disfigurement, as shown in FIGS. 2 and 3. The spray coating was carried out in such that each surfactant was homogeneously coated. Specifically, each transparent molded plastic body 100 was longitudinally and laterally scanned by the spray gun to avoid uneven coating. The distance between each plastic body 100 and the spray gun was 200 to 300 mm. The pressure and the dispense rate for the coating were 294 to 490 kPa and 10 to 20 ml/min, respectively. After the coating, the solvent of each surfactant solution was volatilized by air blow. Instead, each solvent may be naturally volatilized. With the above coating and volatilization, a plurality of transparent molded plastic articles 2, each of which includes the surfactant layer 200 that had a homogeneous density of 800 mg/m$^2$ to 1 g/m$^2$, were formed for the study.

The static potential of each transparent molded plastic article 2 was measured to evaluate the anti-static effect of each surfactant layer 200. The static potential was measured at four points in time, that is, right after the coating and the volatilization, five minute after the coating and the volatilization, ten minute after the coating and the volatilization, and after rubbing each surfactant layer 200. At each measurement point, the static potential was measured with the electric field meter EA-7, RION Co., Ltd. The distance between the sensing part of the electric field meter and each measured spot was 10 mm. The temperature and the relative humidity during each measurement were 25±5° C. and 35 to 50%, respectively. With respect to the fourth point, each surfactant layer 200 was rubbed ten laps by a medical sponge from side to side after the coating and the volatilization, and the static potential was immediately measured.

The durability in appearance of each transparent molded plastic article 2 was evaluated in terms of appearance. The evaluation was carried out using four tests, that is, the first acceleration test, the second acceleration test, the normal condition test, and the chemical reactivity test. In the evaluation, the appearance was visually checked in terms of transparency, which is important from an aesthetic point of view.

Figure 4:
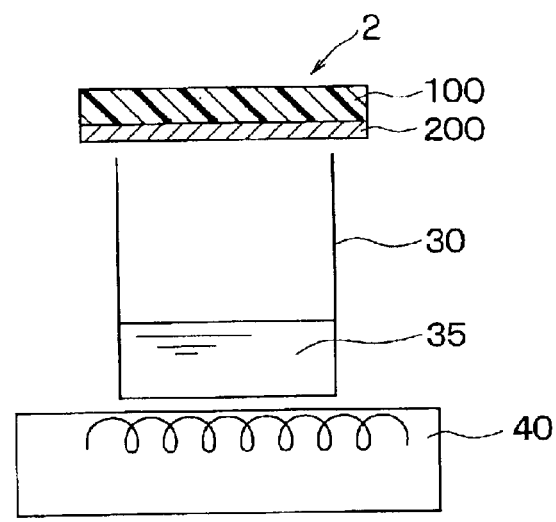
FIG. 4 is a schematic view showing the method for the first acceleration test.

As shown in FIG. 4. each transparent molded plastic article 2 was placed with a slight clearance above a beaker 30 that contains sulfuric acid 35 having a concentration of 50% in the first acceleration test. The beaker 30 and the article 2 placed on a hotplate 40, the temperature of which was 35° C., for five hours. In the first acceleration test, each surfactant layer 200 is supposed to deteriorate the article 2 in an accelerated manner as if the article 2 were actually exposed in the normal atmosphere. Then, the appearance of each surfactant layer 200 was visually checked.

Figure 5:
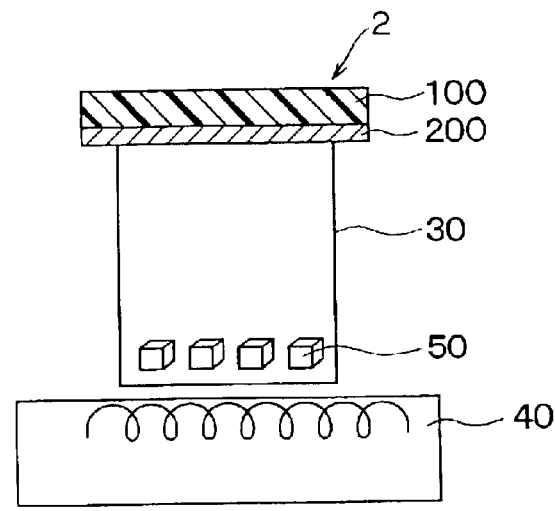
FIG. 5 is a schematic view showing the method for the second acceleration test.

As shown in FIG. 5, in the second acceleration test, each transparent molded plastic article 2 was directly placed on a beaker 30 that contains fragments 50 of a component for a meter assembly of an auto instrument. The fragments 50 were made of ABS resin including calcium sulfate, and the total amount of the fragments 50 were one gram. The beaker 30 and the article 2 were placed on a hotplate 40, the temperature of which was 90° C., for forty-eight hours. In the second acceleration test, each surfactant layer 200 is supposed to deteriorate the article 2 in an accelerated manner as if the article 2 were actually exposed in a closed auto meter. Then, the appearance of each surfactant layer 200 was visually checked.

In the normal condition test, each transparent molded plastic article 2 had been placed in a normal atmosphere at room temperature for 384 hours. Then, the appearance of each surfactant layer 200 was visually checked. In the chemical reactivity test, evaluations were made from the standpoint of the product by the chemical reaction between each surfactant and each of sulfuric acid and ammonium sulfate. The product is thought to cause the deterioration of surfactant layer 200. Sulfuric acid and ammonium sulfate, each of which has a concentration of 1%, were separately dripped with agitation into each of the above diluted surfactant solutions. The appearance of each solution was visually checked five minutes after the dripping. If the product of the chemical reaction was formed, white precipitation was going to be seen.

The static potential of each transparent molded plastic article 2 is preferably lower than 300 V to prevent foreign objects such as small trash and dust from sticking to the article 2. However, even if the static potential is about 500 V, the surfactant is acceptable as an anti-static agent because MMA resin shows a static potential of 1000 to 3000 V without an anti-static agent. Moreover, MMA resin can show a static potential of 5000 V if it is rubbed. Therefore, a static potential of 500 V is low enough in comparison with the static potential of MMA resin without an anti-static agent.

As shown in FIGS. 2 and 3, with any of the surfactants (I) to (VII), the static potential of the corresponding transparent molded plastic article 2 is 550 V or smaller and is in an acceptable range at any of the above four points in time. However, there is a correlation between the capability of reducing the static potential, which represents static electricity, and the mean molecular weight of each surfactant. The higher the mean molecular weight, the better the capability. According to the results of the study, it is concluded that surfactant having a mean molecular weight of 260 or higher can sufficiently prevent the static electricity of the plastic article 2.

In the evaluation of the appearance, each transparent molded plastic article 2 is supposed to have practically no problem unless the article 2 becomes cloudy. As shown in FIGS. 2 and 3, with the surfactants (I) to (V), each of which has a mean molecular weight of 370 or lower, the appearance of the corresponding transparent molded plastic articles 2 remained transparent in the first acceleration test, the second acceleration test, and the normal condition test, and the appearance of the corresponding solutions in the chemical reactivity test also remained transparent. On the other hand, with the surfactants (VI) and (VII), each of which has a mean molecular weight higher than 370, the corresponding transparent molded plastic articles 2 became cloudy in the first acceleration test, the second acceleration test, and the normal condition test, and the corresponding solutions in the chemical reactivity test provided white precipitation.

Figure 6:
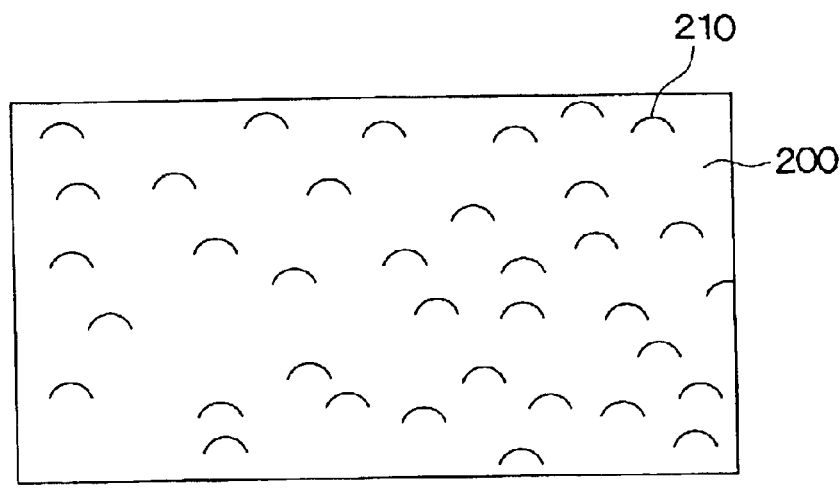
FIG. 6 is a schematic illustration of a cloudy surface of a surfactant layer on the basis of a photograph taken with a scanning electron microscope (SEM) at a magnification of 1000×.

The cloudiness was studied in detailed using a surfactant layer 200 including the surfactant (VII), which had a mean molecular weight of 448. After the second acceleration test, the surface of a cloudy surfactant layer 200 was observed with a scanning electron microscope (SEM). As shown in FIG. 6 it turned out that hemispherical microscopic bumps 210 caused the cloudiness. Then, the components of the cloudy surfactant layer 200 after the second acceleration test and those of the virgin surfactant layer 200 before the test were analyzed by ion chromatography.

The detected ions in the analysis of the cloudy surfactant layer 200 and their quantities, which are the ones contained in an area of 150 cm² of the cloudy surfactant layer 200, were 0.2 μg of F⁻, 2.8 μg of Cl⁻, 1.8 μg of NO₃, less than 0.1 μg of Br⁻, less than 0.1 μg of HPO₄²⁻, 12.8 μg of SO₄²⁻, 2.6 μg of Na⁺, 2.3 μg of NH₄⁺, 1.9 μg of K⁺, 0.2 μg of Mg²⁺, and 1.3 μg of Ca²⁻. On the contrary, in the analysis of the virgin surfactant layer 200, the quantity of Cl⁻, which was thought to come from HCl contained in the surfactant (VII), was 0.29 μg. and those of other ions were less than 0.1 μg. As shown by the analysis results, a relatively large amount of SO₄²⁻, which was thought to come from S existing outside the layer 200, was included in the cloudy surfactant layer 200. Therefore, it is speculated that the main component of the bumps 210 is a sulfate.

The chemical reactions that caused the cloudiness are thought to be expressed in the following equations.

$$SO_X + H_2O \rightarrow H_2SO_{(X+1)} \quad (1)$$

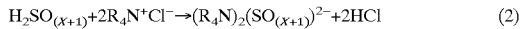

$$H_2SO_{(X+1)} + 2R_4N^+Cl^- \rightarrow (R_4N)_2(SO_{(X+1)})^{2-} + 2HCl \quad (2)$$

According to the reaction in the equation (1), ambient $SO_X$ reacts with $H_2O$ in the virgin surfactant layer 200, and $H_2SO_{(X+1)}$ is produced. Then, $H_2SO_{(X+1)}$ reacts with $R_4N^+Cl^-$, which is the surfactant (VII), to form the sulfate, which causes the cloudiness.

According to the above results, it is concluded that quaternary surfactants having a mean molecular weight higher than 370 are excellent in the capability of reducing the static electricity of transparent molded plastic bodies, on which the quaternary surfactants are coated, however they indirectly react with $SO_X$ to cause cloudiness and disfigure corresponding transparent molded plastic articles. It is also concluded that quaternary surfactants having a mean molecular weight lower than 260 are excellent in the durability in terms of transparency, however they are unacceptable in the capability of reducing the static electricity. In FIGS. 2 and 3, the surfactants (I) to (VII) are rated in consideration of the capability of reducing the static electricity and the durability in terms of transparency.

In the surfactants (I) to (VII), the surfactant (V), which has a mean molecular weight of 370, provides the best performance of all. The surfactants (III) and (IV), which respectively have a mean molecular weight of 320 and a mean molecular weight of 362, provide preferable performance. The surfactants (I) and (II), which respectively have a mean molecular weight of 264 and a mean molecular weight of 362, provide acceptable performance. The surfactants (VI) and (VII), which have a mean molecular weight higher than 370, are unacceptable.

In conclusion, if the surfactant layers 20 that contains a quaternary ammonium salt having a mean molecular weight of 260 to 385 as a surfactant are used in the transparent molded plastic article 1 as shown in FIG. 1, it is possible to sufficiently eliminate static electricity of the transparent molded plastic 10, and simultaneously it is possible to prevent the appearance of the plastic article 1 from deteriorating even if the plastic article 1 is applied to, for example, components of auto instruments. More specifically, it is possible to prevent the static electricity and appearance deterioration of transparent molded plastic articles used for components such as a meter dial, a meter display panel, and a meter display-panel cover of an auto instrument even if the plastic articles are printed, painted, or exposed by transparency-deteriorating substances such as $SO_X$ included in ABS resin.

Other than $SO_X$, diacidic bases such as carbonate ions and triacidic bases such as phosphate ions can be included in the transparency-deteriorating substances. However, $SO_X$ is thought to most readily come out to and exist in the environment of all.

In the above study, each diluted surfactant solution was sprayed with a spray gun on each surface of the transparent molded plastic bodies 100 to coat each surfactant. However, in manufacturing the transparent molded plastic article 1, a surfactant may be coated on the transparent molded plastic body 10 by immersion or by placing the body 10 in the mist of the solution including the surfactant, other than by spraying. In addition, other than water, alcohol such as ethanol, methanol, and isopropanol may be used as the solvent to dilute the surfactant. A mixture of alcohol and water may also be used. Any solvent that can dissolve or homogeneously disperse the surfactant may be used.

What is claimed is:

1. A transparent molded plastic article comprising:
   a transparent molded plastic body; and
   a surfactant layer, which is located on a surface of the transparent molded plastic body, wherein the surfactant layer contains a quaternary ammonium salt having a mean molecular weight of 260 to 385 to eliminate static electricity of the plastic body, wherein the quaternary ammonium salt is one of the following:
   a) dialkyldimethylammonium salt;
   b) monoalkyltrimethylammonium salt;
   c) a mixture of n-alkyldimethylbenzylammonium salt and n-alkyldimethylammonium salt; and
   d) a combination of any of the salts of a, b and c.

2. The transparent molded plastic article in claim 1, wherein the transparent molded plastic article is a meter display-panel cover of an auto instrument.

3. The transparent molded plastic article in claim 1, wherein the transparent molded plastic article is a meter dial of an auto instrument.

4. The transparent molded plastic article in claim 1, wherein the transparent molded plastic article is a meter display panel of an auto instrument.

5. A transparent molded plastic article comprising:
   a transparent molded plastic body; and
   a surfactant layer, which is located on a surface of the transparent molded plastic body, wherein the surfactant layer contains a quaternary ammonium salt having a mean molecular weight of 260 to 385 to eliminate static electricity of the plastic body, wherein the quaternary ammonium salt includes dialkyldimethylammonium salt.

6. A transparent molded plastic article comprising:
   a transparent molded plastic body; and
   a surfactant layer, which is located on a surface of the transparent molded plastic body, wherein the surfactant layer contains a quaternary ammonium salt having a mean molecular weight of 260 to 385 to eliminate static electricity of the plastic body, wherein the quaternary ammonium salt includes monoalkyltrimethylammonium salt.

7. A transparent molded plastic article comprising:

a transparent molded plastic body; and a surfactant layer, which is located on a surface of the transparent molded plastic body, wherein the surfactant layer contains a quaternary ammonium salt having a mean molecular weight of 260 to 385 to eliminate static electricity of the plastic body, wherein the quaternary ammonium salt includes a mixture of n-alkyldimethylbenzylammonium salt and n-alkyldimethylammonium salt.

8. A transparent part for a vehicle instrument, wherein the transparent part comprises:

a transparent plastic body;

a surfactant layer, which is located on a surface of the transparent molded plastic body, wherein the surfactant layer includes a quaternary ammonium salt that has a mean molecular weight of 260 to 385 to reduce the effect of static electricity on the plastic body, wherein the quaternary ammonium salt is one of the following:

a) dialkyldimethylammonium salt;

b) monoalkyltrimethylammonium salt;

c) a mixture of n-alkyldimethylbenzylaminoniuin salt and n-alkyldimethylammonium salt; and d) a combination of any of the salts of a, b and c.

9. The transparent part according to claim 8, wherein the transparent part is a meter display-panel cover of an auto instrument.

10. The transparent part according to claim 8, wherein the transparent part is a meter dial of an auto instrument.

11. The transparent part according to claim 8, wherein the transparent part is a meter display panel of an auto instrument.

12. A transparent part for a vehicle instrument, wherein the transparent part comprises:

a transparent plastic body;

a surfactant layer, which is located on a surface of the transparent molded plastic body, wherein the surfactant layer includes a quaternary ammonium salt that has a mean molecular weight of 260 to 385 to reduce the effect of static electricity on the plastic body, wherein the quaternary ammonium salt includes dialkyldimethylammonium salt.

13. A transparent part for a vehicle instrument, wherein the transparent part comprises:

a transparent plastic body;

a surfactant layer, which is located on a surface of the transparent molded plastic body, wherein the surfactant layer includes a quaternary ammonium salt that has a mean molecular weight of 260 to 385 to reduce the effect of static electricity on the plastic body, wherein the quaternary ammonium salt includes monoalkyltrimethylammonium salt.

* * * * *